(12) United States Patent
Ross et al.

(10) Patent No.: US 10,614,489 B1
(45) Date of Patent: Apr. 7, 2020

(54) DIRECT TO CONSUMER ENGAGEMENT SYSTEM

(71) Applicant: MASSACHUSETTS MUTUAL LIFE INSURANCE COMPANY, Springfield, MA (US)

(72) Inventors: Gareth Ross, Amherst, MA (US); Sears Merritt, Groton, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 1069 days.

(21) Appl. No.: 14/966,619

(22) Filed: Dec. 11, 2015

Related U.S. Application Data

(60) Provisional application No. 62/091,116, filed on Dec. 12, 2014.

(51) Int. Cl.
*G06Q 30/02* (2012.01)
*G06F 3/0484* (2013.01)
*G06F 16/248* (2019.01)
*G06F 16/958* (2019.01)
*G06F 16/9535* (2019.01)
*G06F 16/955* (2019.01)
*G06F 16/957* (2019.01)
*G06F 16/2457* (2019.01)

(52) U.S. Cl.
CPC ..... *G06Q 30/0269* (2013.01); *G06F 3/04842* (2013.01); *G06F 16/248* (2019.01); *G06F 16/24575* (2019.01); *G06F 16/9535* (2019.01); *G06F 16/9558* (2019.01); *G06F 16/9577* (2019.01); *G06F 16/972* (2019.01); *G06Q 30/0201* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2006/0173747 A1* | 8/2006 | Gantman | G06Q 30/0238 705/14.38 |
| 2013/0254030 A1* | 9/2013 | Criou | G06F 17/30675 705/14.54 |

(Continued)

OTHER PUBLICATIONS

Li, Cong; Meeds, Robert. Different forced exposure levels of internet advertising. American Academy of Advertising. Conference. Proceedings; Lubbock : 200-207. Lubbock: American Academy of Advertising. (2005) (Year: 2005).*

*Primary Examiner* — William A Brandenburg
*Assistant Examiner* — Christopher C Busch
(74) *Attorney, Agent, or Firm* — Eric L. Sophir; Dentons US LLP

(57) ABSTRACT

Unlike conventional systems, an engagement platform is able to provide information to the user, give insight as to why the product was recommended, and distinguish their own product from the products of other providers. As a result, the user is able to gain transparency into a process that conventionally does not represent why a user is being targeted with a particular product or which product is associated with the recommendation engine. Instead, conventional user interfaces merely present the information in manner without showing information about the reason for the generation of that message or prompt and without any visible indicators of which products are sold by the host of that interface versus other competitors.

16 Claims, 5 Drawing Sheets

(56) References Cited

U.S. PATENT DOCUMENTS

2014/0172562 A1* 6/2014 Weatherford ...... G06Q 30/0256
                                                705/14.54
2015/0358766 A1* 12/2015 McDevitt ........... G06Q 30/0261
                                                705/14.58

* cited by examiner

DIRECT TO CONSUMER ENGAGEMENT SYSTEM

CROSS-REFERENCE TO RELATED APPLICATIONS

This application claims priority to U.S. Provisional Patent Application Ser. No. 62/091,116, filed Dec. 12, 2014, which is hereby incorporated by reference in its entirety.

FIELD OF THE DISCLOSURE

The present disclosure relates in general to consumer engagement platforms.

BACKGROUND

Current consumer engagement systems take a passive role regarding member interaction. For example, consumers lack energy awareness of other consumer's satisfaction with products and services, the these consumers have limited ways of interacting with other consumers.

Additionally, consumers may often lack transparency regarding the affiliations between product recommendation engines and the company that provides the services and, as a result, may feel that there is a form of "hook" in using the recommendation service. Many companies additionally take a passive role in product recommendations for services unaffiliated with their first party service providers, leaving it up to the consumer to manually determine their preferences in relative isolation.

These and other factors may lead to a lack of interest in consumers with regards to interaction with company platforms. They may additionally hinder sales or otherwise negatively affect how the company is perceived by the general public. Conventional consumer engagement systems do not offer this functionality. Instead, conventional systems recommend products to consumers by presenting a web page or electronic message that identifies a product or service without any indication why the consumer should or want to purchase that product or service. Also, conventional systems may offer products, but those products are usually limited to the host's own products, so there is no comparison with other providers. The conventional systems also do not recognize that the user is engaging with content and interact and inform the user once the content has been presented.

Hence, there is an ongoing need to provide a platform capable of better engaging consumers, whereby a consumer can view a user interface that can provide more transparency by showing why the consumer should purchase a particular product or service and which providers are offering comparable products.

SUMMARY

Unlike conventional systems, an engagement platform described herein is able to provide information to the user, give insight as to why the product was recommended, and distinguish their own product from the products of other providers. As a result, the user is able to gain transparency into a process that conventionally does not represent why a user is being targeted with a particular product or which product is associated with the recommendation engine. Instead, conventional user interfaces merely present the information in manner without showing information about the reason for the generation of that message or prompt and without any visible indicators of which products are sold by the host of that interface versus other competitors.

Described here is a direct to consumer engagement system, including an engagement platform with modules suitable for allowing interactions between a plurality of members and providing the members with one or more products or services offered by a plurality of first, second, and third party service providers.

In one or more embodiments, engagement platforms may include any suitable number of computing devices connected to other system components using suitable communication interfaces. In one or more embodiments, engagement platforms may include modules allowing platform members to interact with each other, content providers, and service providers. In one or more embodiments, content providers may provide media in any suitable format for consumption using one or more suitable client devices, or may otherwise provide access to electronic booking or other information about content not suitable for consumption on a computing device.

The engagement platform may include a CPU, storage, memory, communication interfaces, product and service provider databases, interaction APIs, member interaction modules, communal engagement modules, data mining modules, service provider interaction modules, and data interpretation modules.

Product and service provider databases may include any suitable collection of data describing products associated with service providers, including rating data, price data, and other suitable data. Suitable products described may include one or more insurance products, banking products, legal products, and suitable combinations, amongst others. Although an exemplary embodiment may recite the use of insurance, it is intended that any product or service from various providers can be used.

A member interaction module may allow one or more members to interact with one or more other members. Member interaction modules may allow one or more members to rate contributions made to the platform by one or more other members, rate contributions to the platform made by content providers, rate products offered service providers, handle member input, allow members to form communities, and to invite non-members to become members. Member Interaction modules may additionally allow members to engage with one or more content providers.

A communal engagement module may perform sets of defined actions on receiving member input, including managing member ratings, determining what information is presented to members inside or outside a community, and other actions.

A data mining modules mine content available on content providers accessible to the engagement platform, including data that may be of relevance to members, data of relevance in rating content, products, and members associated the platform, and data that may be of use in determining member demographics, amongst other data. In one or more embodiments, the data mining module may mine social media, online resources, and other suitable media.

A service provider interaction module may provide an interface between service provider UIs and platform members. Service provider interaction modules may also direct members to provider communication channels, including websites, phone numbers, e-mail forms, and other suitable channels. In one or more embodiments, service provider interaction module may generate lists of products matching a desired rule set, including similarity to a desired product, a desired rating threshold, and other suitable characteristics.

A data interpretation module may interpret data in order to perform a desired set of actions, including aggregating content provider ratings, service provider ratings, content ratings, and product ratings, defining member demographics, interpreting member demographics, and other suitable actions.

Disclosed herein are methods for product selection and content selection using an engagement platform.

In one or more embodiments, an engagement platform may provide greater transparency when presenting first party service provider products. The platform may additionally provide insight into the demographic behavior of member groups and communities, as well as provide a platform where members may interact and generate product and service recommendations.

In one embodiment, a method comprises generating, by an engagement platform server, a first web page for rendering on a web browser of a client device, wherein the first web page is configured to receive an input from the client device representing a request for electronic media; identifying, by the engagement platform server, a demographic of a user associated with the client device; generating, by the engagement platform server, a second web page for rendering on the web browser of the client device, wherein the second web page comprises at least one dynamic sub-interface that is populated with information representing at least one media record identified in a data storage as responsive to the request and having a criteria of the identified demographic; upon an activation of a link associated with a media record in one of the at least one dynamic sub-interface, dynamically retrieving, by the engagement platform server, media content associated with the media record having the link and generating, by the engagement platform server, a third web page for rendering on the web browser of the client device, wherein the third web page comprises the media content; upon an expiration of a predetermined time period from a time stamp of the rendering of the third web page, dynamically generating, by the engagement platform server, a fourth web page comprising information of how other users having a criteria of the demographic of the user of the client device have purchased a product or service associated with the media content on the third web page; receiving, by the engagement platform server, a request inputted on the fourth web page that initiates a query for an offer for the product or service; simultaneously accessing, by the engagement platform server, a plurality of provider servers to obtain data representing offers for the product or service; generating, by the engagement platform server, a fifth web page for rendering on the web browser of the client device, wherein the fifth web page has at least one dynamic sub-interface configured to be populated with data representing offers for the product or service from the plurality of providers servers, and wherein an offer from a host of the engagement platform server for the product or service is populated in a dynamic sub-interface having a visually distinct format from any other data representing an offer for the product or service from the plurality of provider servers.

In another embodiment, a method comprises generating, by an engagement platform server, a first web page for rendering on a web browser of a client device, wherein the first web page is configured to receive an input from the client device representing a request for electronic media; identifying, by the engagement platform server, a demographic of a user associated with the client device; generating, by the engagement platform server, a second web page for rendering on the web browser of the client device, wherein the second web page comprises at least one dynamic sub-interface that is populated with information representing at least one media record identified in a data storage as responsive to the request and having a criteria of the identified demographic; upon an activation of a link associated with a media record in one of the at least one dynamic sub-interface, dynamically retrieving, by the engagement platform server, media content associated with the media record having the link and generating, by the engagement platform server, a third web page for rendering on the web browser of the client device, wherein the third web page comprises the media content; upon a scrolling of the third web page to an end of the media content, dynamically generating, by the engagement platform server, a fourth web page comprising information of how other users having a criteria of the demographic of the user of the client device have purchased a product or service associated with the media content on the third web page; receiving, by the engagement platform server, a request inputted on the fourth web page that initiates a query for an offer for the product or service; simultaneously accessing, by the engagement platform server, a plurality of provider servers to obtain data representing offers for the product or service; generating, by the engagement platform server, a fifth web page for rendering on the web browser of the client device, wherein the fifth web page has at least one dynamic sub-interface configured to be populated with data representing offers for the product or service from the plurality of providers servers, and wherein an offer from a host of the engagement platform server for the product or service is populated in a dynamic sub-interface having a visually distinct format from any other data representing an offer for the product or service from the plurality of provider servers.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
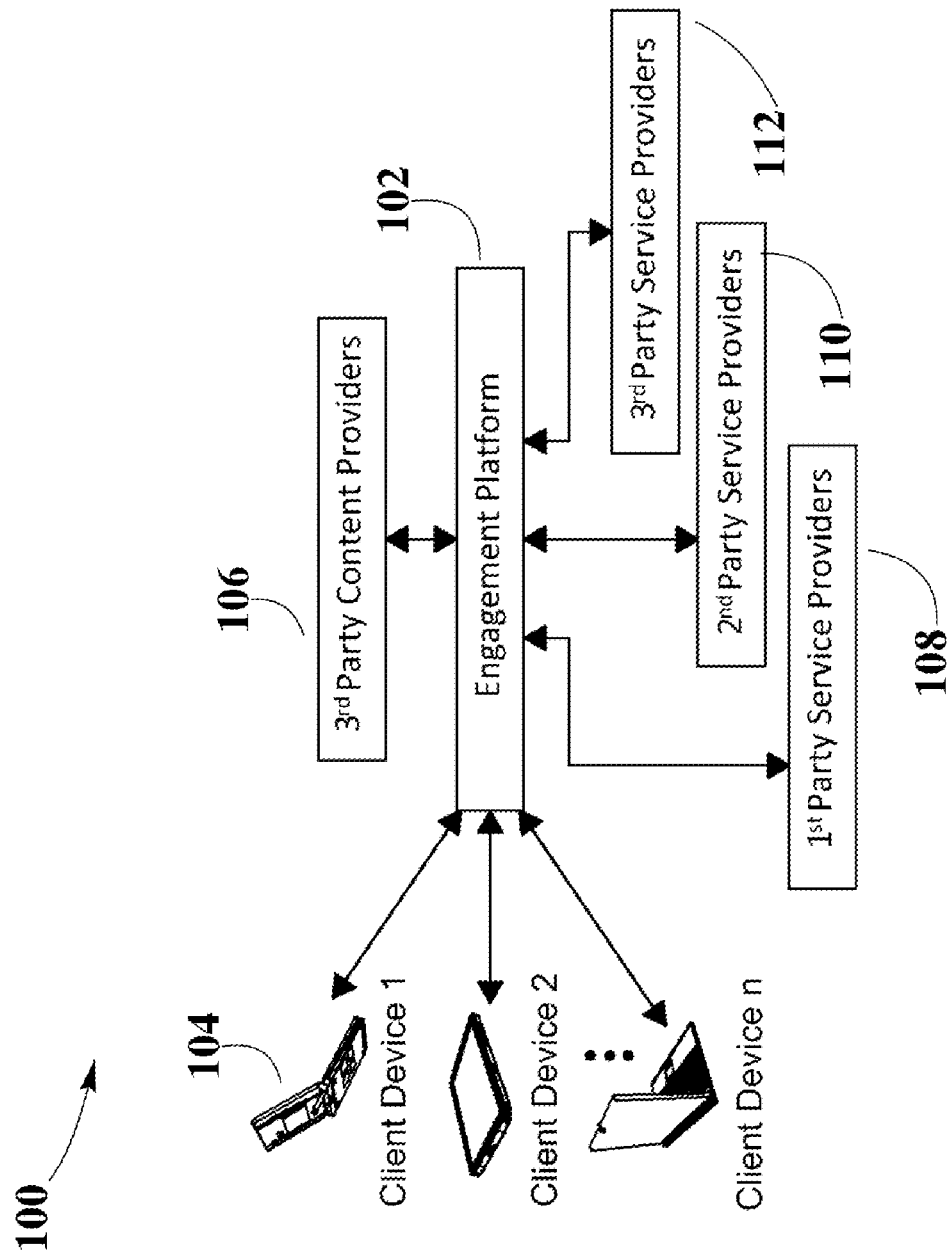
FIG. 1 is a system diagram for a direct to consumer engagement platform, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Engagement Platform" refers to a system, including software and hardware, providing customer value by allowing members to interact in a virtual community. The engagement platform may be a server having a data store, or a combination of servers and data stores that are specially-programmed to execute the features described herein.

"Member" refers to a user enrolled in one or more engagement platforms.

"Member Demographics" refers to member characteristics that allow the categorization of members into a group of similar members, including age, income, interests, education, career orientation, and others.

"Content Provider" refers to any party providing one or more members access to a form of media, including audio, articles, books, speeches, videos, and others.

"Module" refers to any software that completes a defined set of tasks stored on suitable hardware and executed by a processor.

"Service Provider" refers to any party providing one or more services to a member.

"First Party Service Provider" refers to a service provider included in the infrastructure of the company that hosts the engagement platform.

"Second Party Service Provider" refers to a service provider partnered with the company that hosts the engagement platform.

"Third Party Service Provider" refers to a service provider that have yet to establish a partnership with the company that hosts the engagement platform.

"Data mining" may refer to searching for, extracting, and indexing structured data from a non-structured data source.

The present disclosure describes a direct to consumer engagement system, including an engagement platform running any number of modules suitable for allowing interactions between a plurality of members and providing the members with one or more products or services offered by service providers.

FIG. 1 shows a direct to consumer engagement system 100, including engagement platform 102, client devices 104, content providers 106, first party service providers 108, second party service providers 110, and third Party Service Providers 112. The first party service provider 108 can be a service provider included in the infrastructure of the company that hosts the engagement platform 102. The second party service provider 110 can be a service provider partnered with the company that hosts the engagement platform 102. The third party service provider 112 can be a service provider that has yet to establish a partnership with the company that hosts the engagement platform 102.

In one or more embodiments, engagement platform 102 may include any suitable number of suitable computing devices connected to other system components using any suitable communication interface. Suitable computing devices may include one or more servers, personal computing devices, mobile computing devices, and suitable combinations. Suitable communication interfaces may include wired communication interfaces and wireless communication interfaces, including local area networks, Wi-Fi networks, cellular networks, workplace intranets, and the internet, among others.

In one or more embodiments, engagement platform 102 includes modules that may allow two or more members of engagement platform 102 using one or more client devices 104 to interact through engagement platform 102, one or more content providers 106 to interact with the members, and one or more first party service providers 108, second party service providers 110, and third party service providers 112 to interact with the members.

Client devices 104 may include any suitable computing device including one or more user input/output interfaces, including personal computing devices, mobile computing devices, smartphones, tablets, PDAs, gaming consoles, smart watches, and others. Client devices 104 may communicate with engagement platform 102 using any suitable communication interface, including wired communication interfaces and wireless communication interfaces, including local area networks, Wi-Fi networks, cellular networks, workplace intranets, and the internet, among others.

n one or more embodiments, content providers 106 may provide media in any suitable format for consumption using one or more suitable client devices 104. Suitable media may include audio, video, presentations, interactive media, articles, e-books, electronic magazines, electronic documents, and other electronic media. In other embodiments, content providers 106 may additionally provide access to content not suitable for consumption using one or more client devices 104, and may instead provide electronic booking or other information about the content. Content not suitable for consumption using one or more client devices 104 may include live speeches by public speakers, books in print, live presentations, magazines in print, and others.

Figure 2:
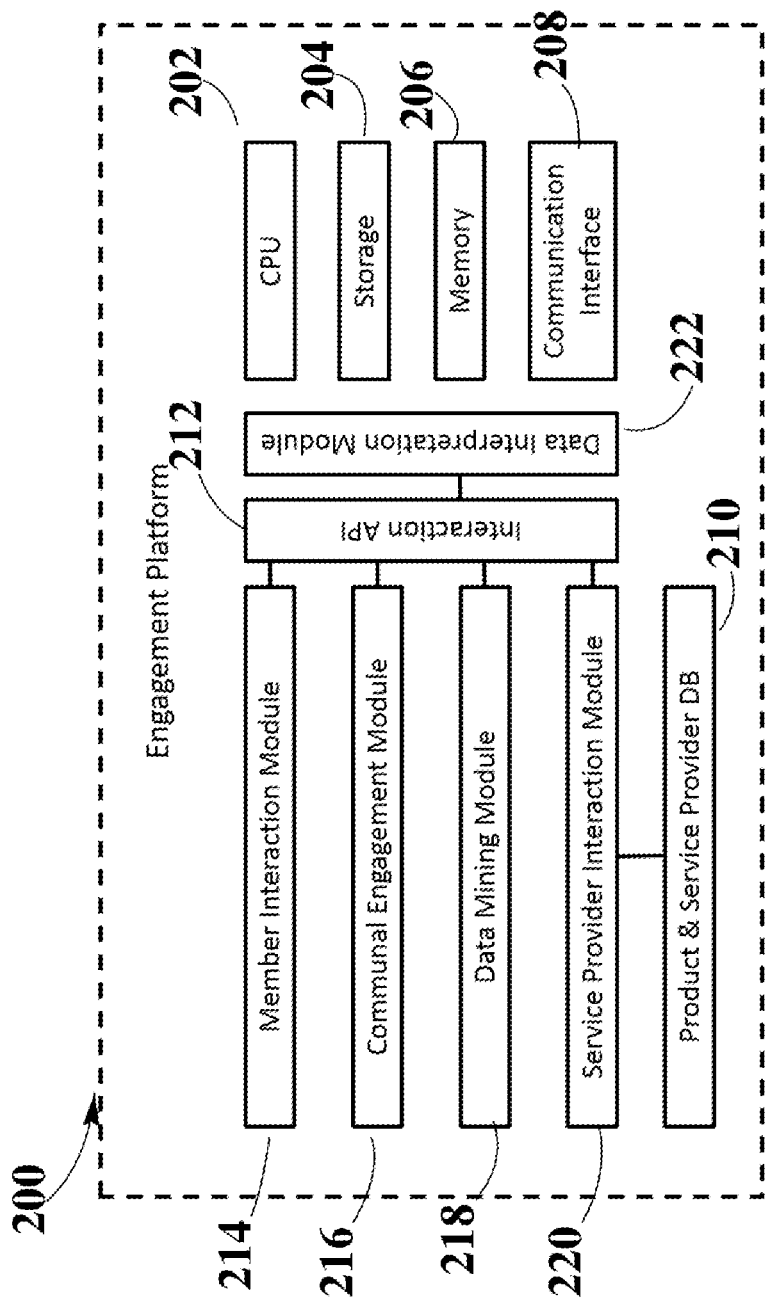
FIG. 2 is an architecture for an engagement platform, according to an embodiment.

FIG. 2 shows an engagement platform 200 having CPU 202, storage 204, memory 206, communication interface 208, product and service provider database 210, interaction API 212, suitable for running one or more modules, including member interaction module 214, communal engagement module 216, data mining module 218, service provider interaction module 220, and data interpretation module 222.

CPU 202 may be any electrical processing unit suitable for running one or more software modules. Storage 204 may be any data storage unit suitable for storing data. Memory 206 may be any memory unit of use in running software modules. Communication interface 208 may be any communication interface suitable for allowing engagement platform 200 to communicate with any number of other suitable computing devices, including Bluetooth interfaces, Wi-Fi interfaces, LAN interfaces, cellular communication interfaces, and others. Product and service provider database 210 may be any suitable collection of data describing products associated with any suitable number of first, second, and third party service providers. In one or more embodiments, this may include rating data, price data, and other suitable data. Suitable products described may include one or more insurance products, banking products, legal products, and suitable combinations, amongst others. Interaction API 212 may include one or more application programming interfaces suitable for allowing one or more modules to exchange member interaction data, service provider data, product data, other suitable data, and suitable data combinations.

Member interaction module 214 may include software running on suitable hardware included in engagement platform 200, where member interaction module 214 may allow one or more members to interact with one or more other members. In one or more embodiments, member interaction module 214 may allow one or more members to rate contributions made to the platform by one or more other members, contributions to the platform made by content providers, and products offered by first, second, and third party service providers. Member interaction module 214 may handle member input into engagement platform 200, including upvoting, downvoting, product requests, content requests, questions, and answers, amongst others. Member interaction module 214 may additionally allow members to form communities, and to invite non-members to become members. In additional embodiments, member interaction module 214 may allow members to engage with one or more content providers, where the engagement may include downloading media, viewing media, and making appointments to engage in community activities, amongst others.

Communal engagement module 216 may include software running on suitable hardware included in Engagement Platform 200, where communal engagement module 216 may perform sets of defined actions on receiving member input. Suitable actions may include managing member ratings within engagement platform 200, where members whose interactions have been rated highly by other members may be recognized as members of value to the community. Other suitable actions include determining what information is presented to members forming a community and determining what information is presented to members outside a community, amongst others.

Data mining module 218 may include software running on suitable hardware included in engagement platform 200, where data mining module 218 may mine content available on content providers accessible by engagement platform 200 for content data that may be of relevance to one or more members, for data that may be of relevance in rating content, products, and members associated with engagement platform 200, and for data that may be of use in determining member demographics, amongst other data. In one or more embodiments, data mining module may mine information from social media, from online resources (including online newspapers, review websites, and blogs), and other suitable media.

Service provider interaction module 220 may include software running on suitable hardware included in engagement platform 200, where service provider interaction module 220 may provide an interface between service provider user interfaces and members of engagement platform 200. In one or more embodiments, this may include a direct interface between a first, second, or third party web interface and a user interface presented to a member by engagement platform 200. In other embodiments, service provider interaction module may redirect members to an external communication channel, including third party websites, phone numbers, e-mail forms, and other suitable channels. In one or more embodiments, service provider interaction module 220 may use information included in product and service provider database 210 to generate lists of products matching a desired rule set, including similarity to a desired product, a desired rating threshold, and other suitable characteristics.

Data interpretation module 222 may include software running on suitable hardware included in engagement platform 200, where data interpretation module 222 may interpret data in order to perform a desired set of actions, including aggregating content provider ratings, service provider ratings, content ratings, and product ratings, defining member demographics, interpreting member demographics, and other suitable actions.

An exemplary method follows. A user accesses an engagement platform server by using a client device that is communicatively coupled to the engagement platform. The engagement platform server generates a graphical user interface, such as a web page to be rendered on web browser on the client device. The web page on the client device receives an input that represents a request from the user, and the input is transmitted to the engagement platform server. The request may be a request for electronic media to be displayed on the client device, where the electronic media is associated with a particular topic. The engagement platform receives the request and queries a data storage for records representing media associated with that topic. The engagement platform then generates a new web page to be rendered on the web browser of the client device, where the new web page presents a listing of each relevant media record. The web page generates the web page to populate each dynamic sub-interface within the web page from the data storage to include information from each relevant media record as well as a rating. The relevant media records can also be sorted by popularity.

Figure 5:
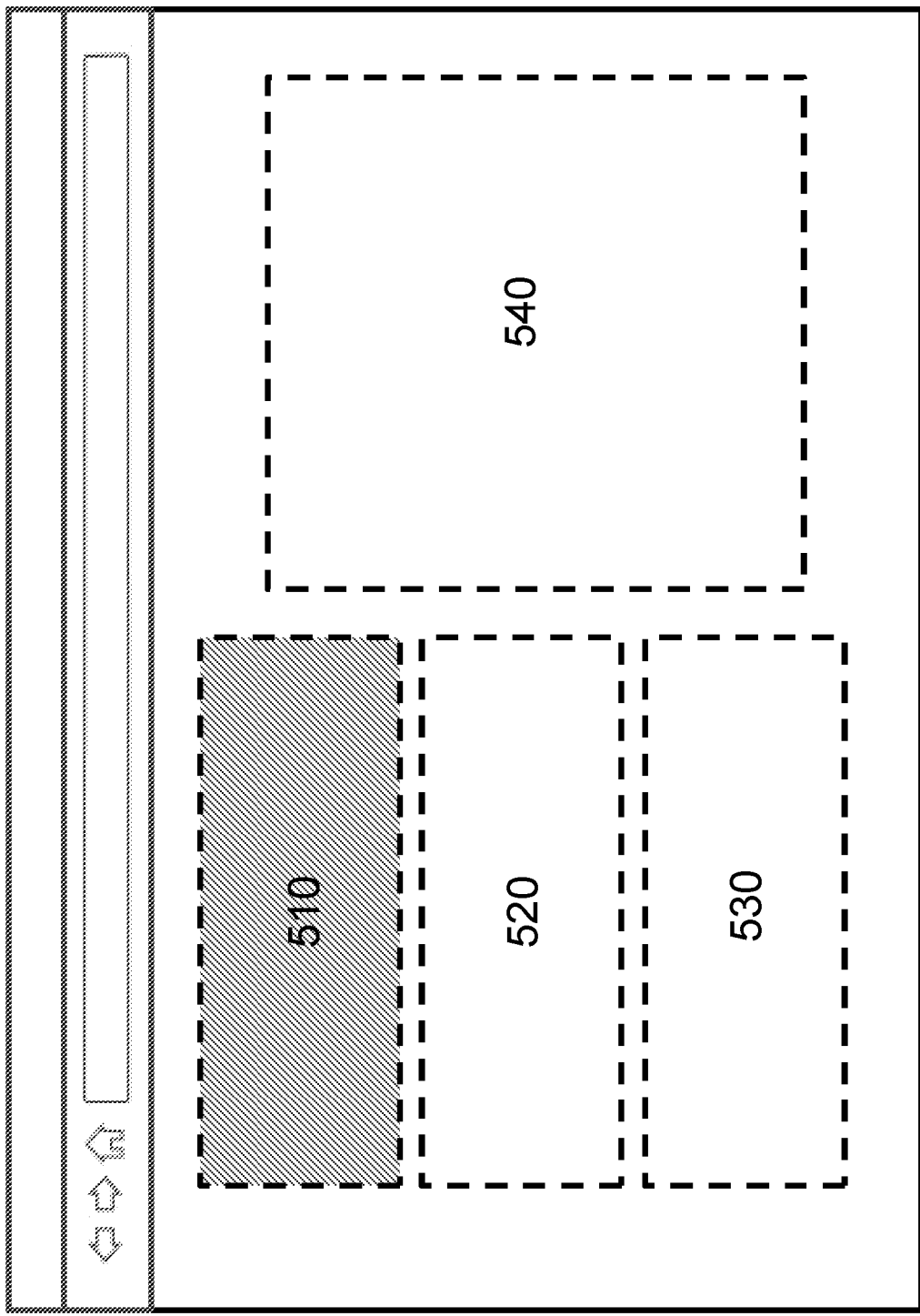
FIG. 5 is a web page user interface having a plurality of dynamic sub-interfaces, according to an embodiment.

Each dynamic sub-interface can be configured as an HTML 5 container or other structural element, which has a hierarchical structure that incorporates media or content and can interact with other applications using APIs. As shown in FIG. 5, a web page 500 can be configured to include one or more dynamic sub-interfaces 510, 520, 530, 540. In this example, dynamic sub-interface 510 can have a different format or configuration to distinguish its content from other sub-interfaces 520, 530. Each web page generated by the engagement platform, transmitted to the client device, and rendered on the web browser of the client device can have a structural format that includes one or more dynamic sub-interfaces that can dynamically retrieve information from a data storage or from a provider via an API.

In one embodiment, the engagement platform server identifies a demographic of the user, and the engagement platform can query the data storage for media records that are associated with that demographic. The demographic can be identified based upon a profile associated with the user who logged in to access the engagement platform. Alternatively, the engagement platform can query the user. The association may be based upon a tag in the media record or a relevance of the topic to the particular demographic. The association may be based upon one criteria of the demographic that matches, and it is not required that the media record match every criteria of the user associated with the client device. The web page generated by the engagement platform can sort or rank the relevant media records according to relevance to the demographic, popularity with the demographic (e.g., number of times read by someone of that demographic), or the like.

The user activates a link associated with each record by clicking, touching, or otherwise selecting the link on the web page associated with that record. Upon the activation of that link, the engagement platform retrieves the content associated with the selected media record and presents it for display on the web browser of the client device. Once the client device navigates on the web browser from the content displayed, e.g., back to the previous web page listing relevant media records or to another web page that allows input of another query or input, the engagement platform generates a pop-up window, (or light box), a new web page, or populates a dynamic sub-interface on an existing page to include information about how other users in the demographic of the user have purchased products or services associated with the content of the media file. In one embodiment, the engagement platform can generate this pop-up window, new web page, or populate the dynamic sub-interface after a predetermined amount of time (e.g., 30 second, 1 minute, 2 minutes, 5 minutes) has expired since the web page was loaded with the content of the media file. The time can be based upon a timestamp for loading the web page and be programmed to dynamically generate the new web page or content within a predetermined amount of time elapsing from that timestamp. In an alternative embodiment, the engagement platform can generate this pop-up window, new web page, or populate the dynamic sub-interface after the web browser has scrolled to the bottom of the web page having the content of the media file. When the scroll bar is positioned at or near the bottom of the content, the engagement platform will dynamically generate the new web page or content accordingly. Conventional systems do not have such a manner of determining when a user has reviewed electronic media.

In one example, if the web page presents content associated with a life insurance product to a client device of a 30 year old female, then the engagement platform will generate a prompt for a pop-up window, new web page, or populate a dynamic sub-interface on the web page after the content is read by the user to inform the use that other 30 year old females usually purchase a particular life insurance policy in a certain amount.

The user then has some transparency into why a particular product or service is being recommended for the user. The user can input a query into the web page on the web browser that requests a search for the product on the engagement platform. The engagement platform receives the query and simultaneously communicates via an API with a plurality of providers to search for products or services that satisfy the query. The provider servers respond via the API with offers that contain the criteria of the query. The engagement platform retrieves comparable offers for at least two providers, though more provider offers may be presented. The engagement platform generates a new web page that is transmitted for rendering on the web browser of the client device, whereby the engagement platform populates dynamic sub-interface on the web page to include information representative of each offer. The dynamic sub-interface can be linked to the provider using an API. The engagement platform may be associated with a provider, and any offers from the provider associated with the engagement platform is populated in a first dynamic sub-interface. The first dynamic sub-interface, which can be positioned at any location respective to the other dynamic sub-interfaces, can be rendered in a color, shape, font, or other format to visually distinguish the information in this dynamic sub-interface from the other dynamic sub-interfaces having information representing offers from other providers. This indication presents further transparency to the user to identify the source of that particular offer. The dynamic sub-interfaces can be interactive such that activating a link associated with the dynamic sub-interface will generate a new web page associated with the purchase of that product or service of that provider.

Unlike conventional systems, the engagement platform is able to provide information to the user, recognize when the user has viewed content, give insight as to why the product was recommended, and distinguish their own product from the products of other providers. As a result, the user is able to gain transparency into a process that conventionally does not represent why a user is being targeted with a particular product or which product is associated with the recommendation engine. Instead, conventional user interfaces merely present the information in a manner without showing information about the reason for the generation of that message or prompt and without any visible indicators of which products are sold by the host of that interface versus other competitors.

Figure 3:
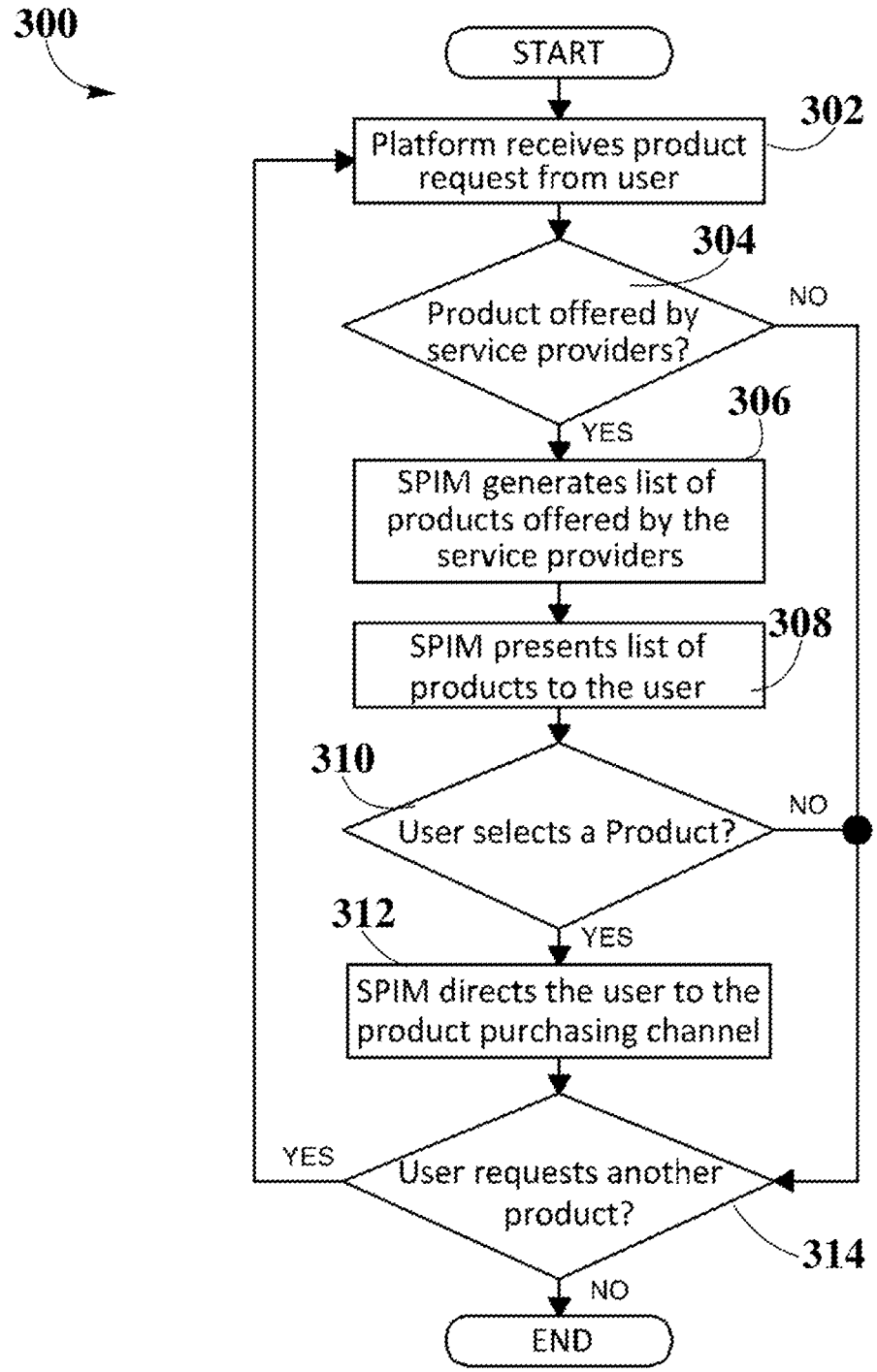
FIG. 3 is a flowchart for handling a user's product request, according to an embodiment.

FIG. 3 shows a product selection 300 process according to an exemplary embodiment. In product selection 300, the process may begin with step 302, where the platform may receive a product request from member. In this step, a member interaction module receives an input from a user utilizing a suitable client device with a product request. In one or more embodiments, the request may include a criteria characterizing the desired product, such as the product type, product price, product rating, service provider, type of service provider, location availability, and others.

The process may continue with check 304, where an SPIM (service provider interaction module) determines if the product is offered by one or more service providers. In this step, the SPIM determines whether a service provider offers a product matching the criteria in the product request using a suitable algorithm. If the SPIM determines one or more service providers offers a matching product, the process may continue with step 306. Otherwise, the process continues with check 314.

In step 306, the SPIM generates the list of matching products offered by the service providers. In one or more embodiments, the list may include information that indicates whether the product is offered by a first, second, or third party service provider. In some embodiments, products associated with a first party service provider may be highlighted as such so as to emphasize the service provider's relationship to the company owning the engagement platform.

In step 308, the SPIM presents the list of products to the user through a suitable interface on a client device.

The process may continue with check 310, where the member interaction module may determine if the user selects a product. If the user selects a product from the list presented to the user by the SPIM, the process continues with step 312. Otherwise, the process continues with check 314.

In step 312, the SPIM directs the user to the product purchasing channel. In one or more embodiments, suitable purchasing channels may include an embedded purchasing mechanisms, external websites, e-mail order forms, phone calls, and video calls, amongst others.

In check 314, the member interaction module may determine whether the member requests another product. If the member requests another product, the process may continue with step 302. Otherwise, the process may end.

Figure 4:
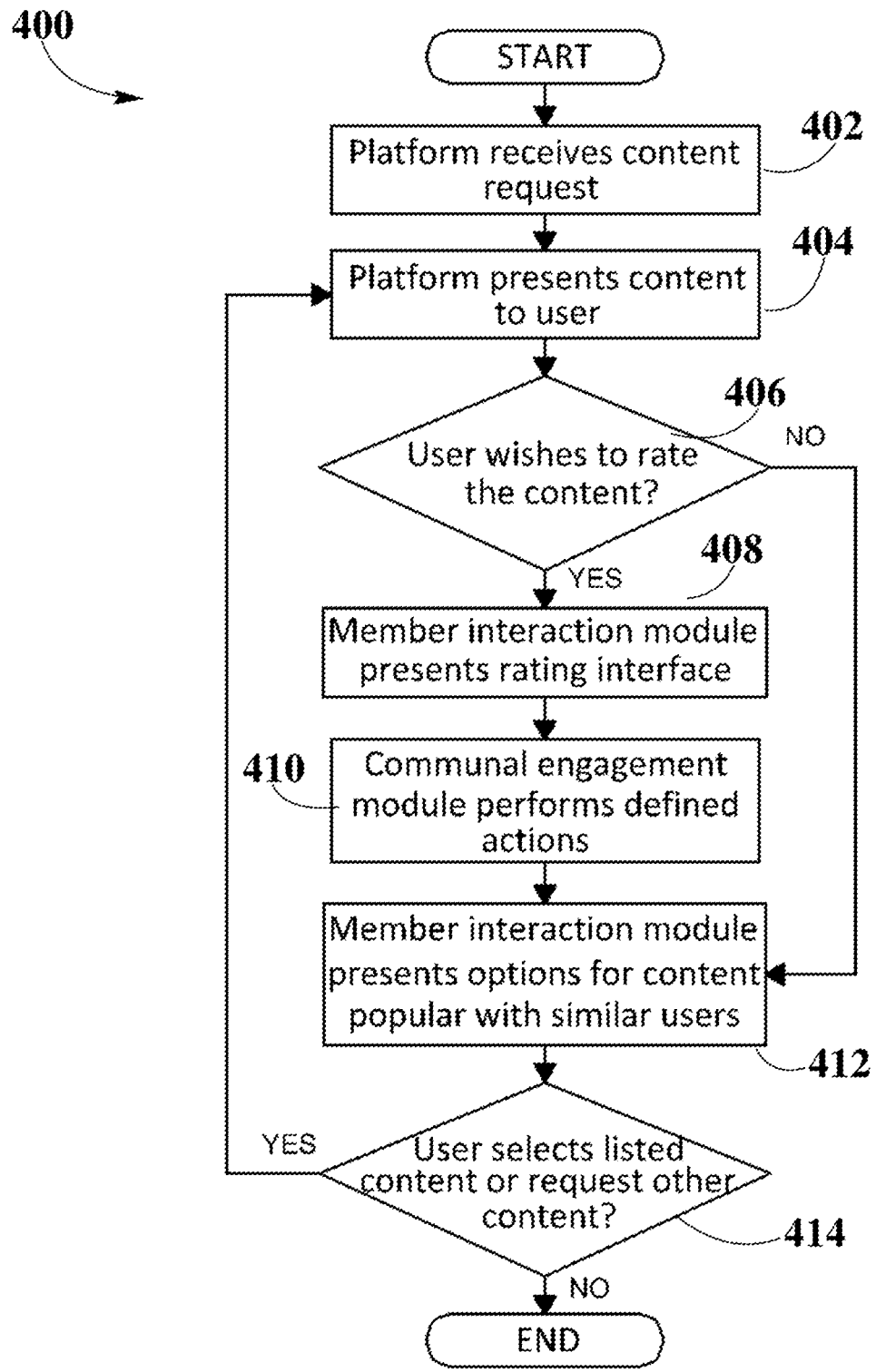
FIG. 4 is a flowchart for handling a user's content request, according to an embodiment.

FIG. 4 shows a content selection 400 process according to an exemplary embodiment. Content selection 400 may begin with step 402, where the platform may receive a content request from a member. In this step, a member interaction module receives an input, from a user utilizing a suitable client device, with a content request.

The process may then continue with step 404, in which the platform may present the requested content to the member. In one or more embodiments, the content may be from a first, second, or third party content provider, and may include any suitable media, including audio, video, articles, blog posts, and interactive media, amongst others. In other embodiments, the content may include a summary of a product a member has previously purchased. In additional embodiments, the content may include questions, answers, or other text written by members.

The process may then continue with check 406, where the Member Interaction Module may determine if the user wishes to rate the content presented. If the user decides to rate the content, the process may continue with step 408. Otherwise, the process may continue with step 412.

In step 408, the Member Interaction Module presents a rating interface to the member. In one or more embodiments, the rating interface may present options to upvote or downvote the content with respect to other content in the content category. In other embodiments, the rating interface may present a rating system, such as a 5 star rating system, a letter grade rating system, or other suitable rating systems.

The process may continue with step 410, where the communal engagement module performs a defined set of actions. In one or more embodiments, a defined set of actions may include managing member ratings within the engagement platform, engaging a data interpretation module through an Interaction API in order to aggregate content provider ratings, service provider ratings, content ratings, and product ratings, define member demographics, interpret member demographics, and other suitable actions.

The process may then continue with step 412, where the member interaction module presents the member options for content popular with similar users. In one or more embodiments, the member interaction module interacts with a data interpretation module through an Interaction API in order to determine which content to present to the user.

The process may then proceed to check 414, where the member interaction module may determine if the member has selected one or more of the content listed as suggested, or has otherwise requested other content. If the member has, the process may continue with step 404. Otherwise, the process may end.

Example #1 is an example of a platform member purchasing insurance using an engagement platform. In this example, the user is a member requesting content through a mobile computing device. The member requests an article on investments and is presented with a choice between several articles with varying ratings, sorted by popularity with other members of a similar demographic. The user reads the content, and after finishing is presented with a prompt informing the user that others having similar demographics purchase life insurance. The member then searches for life insurance products on the platform, and the platform determines that a first, second, and third party provider all offer products similar to what the user is requesting. The platform then presents the products to the user, where those associated with a first party service provider are highlighted to emphasize their association with the company owning the platform. The user selects the desired product and is directed to a communication channel. The user uses a computing device to purchase the product.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
identifying, by an engagement platform server, a demographic of a user associated with a client device transmitting a request for electronic media;
generating, by the engagement platform server, a first web page for rendering on a web browser of the client device, wherein the first web page comprises at least one dynamic sub-interface that is populated with information representing at least one media record identified in a data storage as responsive to the request and having a criteria of the identified demographic;
upon an activation of a link associated with a media record in one of the at least one dynamic sub-interface, dynamically retrieving, by the engagement platform server, media content associated with the media record having the link and generating, by the engagement platform server, a second web page for rendering on the web browser, wherein the second web page comprises the media content;
upon receiving an indication that the user has scrolled to an end of the second web page, dynamically generating, by the engagement platform server, a pop-up window comprising information of how similar users have purchased a product or service associated with the media content, the engagement platform server displaying the pop-up window concurrently with the second web page, the pop-up window obscuring at least a part of the second web page;
upon the user interacting with the pop-up window, simultaneously accessing, by the engagement platform server, a plurality of provider servers to obtain data representing offers for the product or service displayed on the pop-up window;
generating, by the engagement platform server, a third web page for rendering on the web browser, wherein the third web page has at least one dynamic sub-interface configured to be populated with data representing offers for the product or service from the plurality of provider servers, and wherein an offer from a host of the engagement platform server for the product or service is populated in a dynamic sub-interface having a visually distinct format from other dynamic sub-interfaces and is positioned higher on the third web page than other dynamic sub-interfaces; and
upon the user interacting with a dynamic sub-interface of the third web page, directing, by the engagement platform server, the user to an electronic communication channel interface configured to establish an electronic communication session between the user and the provider server corresponding to the dynamic sub-interface, whereby the user purchases the product or services displaced on the dynamic sub-interface.

2. The method according to claim 1, wherein the request comprises criteria having a topic, and whereby a resulting search query identifies stored media associated with the topic.

3. The method according to claim 1, wherein the dynamic sub-interface on the first web page further comprises a rating the media record.

4. The method according to claim 1, wherein each media record in the at least one dynamic sub-interface is listed in a ranked order.

5. The method according to claim 4, wherein the ranked order is based on popularity.

6. The method according to claim 1, wherein the engagement platform server accesses each provider server via an API.

7. The method according to claim 1, wherein the dynamic sub-interface is visually distinct by rendering in a different color, shape, or font from the other at least one dynamic sub-interface.

8. The method according to claim 1, wherein the at least one dynamic sub-interface of the third web page has a link communicatively coupled to the corresponding provider server via an API.

9. A computer system comprising:
a plurality of provider servers, each server configured to dynamically populate a sub-interface of a web page;
a server in communication with the plurality of provider servers, the server configured to:
identify a demographic of a user associated with a client device transmitting a request for electronic media;
generate a first web page for rendering on a web browser of the client device, wherein the first web page comprises at least one dynamic sub-interface that is populated with information representing at least one media record identified in a data storage as responsive to the request and having a criteria of the identified demographic;
upon an activation of a link associated with a media record in one of the at least one dynamic sub-interface, dynamically retrieve media content associated with the media record having the link and generating, by the engagement platform server, a second web page for rendering on the web browser of the client device, wherein the second web page comprises the media content;
upon receiving an indication that the user has scrolled to bottom of the second web page, dynamically generate a pop-up window comprising information of how similar users have purchased a product or service associated with the media content, the engagement platform server displaying the pop-up window concurrently with the second web page, the pop-up window obscuring at least a part of the second web page;
upon the use interacting with the pop-up window, simultaneously accessing, by the engagement platform server, a plurality of provider servers to obtain data representing offers for the product or service displayed on the pop-up window;
generating, by the engagement platform server, a third web page for rendering on the web browser, wherein the third web page has at least one dynamic sub-interface configured to be populated with data representing offers for the product or service from the plurality of provider servers, and wherein an offer from a host of the engagement platform server for the product or service is populated in a dynamic sub-interface having a visually distinct format from other dynamic sub-interfaces and is positioned higher on the third web page than other dynamic sub-interfaces; and
upon the user interacting with a dynamic sub-interface of the third web page, directing, by the engagement platform server, the user to an electronic communication channel interface configured to establish an electronic communication session between the user and the provider server corresponding to the dynamic sub-interface, whereby the user purchases the product or services displaced on the dynamic sub-interface.

10. The system according to claim 9, wherein the request comprises criteria having a topic, and whereby a resulting search query identifies stored media associated with the topic.

11. The system according to claim 9, wherein the dynamic sub-interface on the first web page further comprises a rating the media record.

12. The system according to claim 9, wherein each media record in the at least one dynamic sub-interface is listed in a ranked order.

13. The system according to claim 12, wherein the ranked order is based on popularity.

14. The system according to claim 9, wherein the engagement platform server accesses each provider server via an API.

15. The system according to claim 9, wherein the dynamic sub-interface is visually distinct by rendering in a different color, shape, or font from the other at least one dynamic sub-interface.

16. The system according to claim 9, wherein the at least one dynamic sub-interface of the third web page has a link communicatively coupled to the corresponding provider server via an API.

* * * * *